United States Patent [19]

Reese

[11] 4,184,864
[45] Jan. 22, 1980

[54] APPARATUS FOR FABRICATING SHARPLY BENT GLASS SHEETS

[75] Inventor: Thomas J. Reese, Sarver, Pa.

[73] Assignee: PPG Industries, Inc., Pittsburgh, Pa.

[21] Appl. No.: 929,382

[22] Filed: Jul. 31, 1978

[51] Int. Cl.² .................................. C03B 23/02
[52] U.S. Cl. ............................. 65/285; 65/287; 65/288; 65/DIG. 4
[58] Field of Search ............ 65/285, 287, 288, DIG. 4

[56] References Cited

U.S. PATENT DOCUMENTS

| | | | |
|---|---|---|---|
| 3,795,501 | 3/1974 | Jansson et al. | 65/106 |
| 3,795,570 | 3/1974 | Jansson et al. | 161/125 |
| 3,847,586 | 11/1974 | Reese et al. | 65/DIG. 4 X |
| 4,047,916 | 9/1977 | Reese et al. | 65/106 |
| 4,066,429 | 1/1978 | Reese et al. | 65/287 X |
| 4,072,493 | 2/1978 | Imler | 65/107 |

Primary Examiner—Arthur D. Kellogg
Attorney, Agent, or Firm—Dennis G. Millman; Edward I. Mates

[57] ABSTRACT

Apparatus for bending one or more glass sheets to a sharp bend by a combination of overall heating and localized heating using an outline glass sheet bending mold comprising one or more electroconductive heating elements in the form of a ribbon. Means is provided to tension the ribbon so that it does not wrinkle when the ribbon expands thermally due to the application of electrical energy thereacross. The ribbon is tensioned by one or more electrodes. Means is provided to maintain the electrodes attached to the mold in case the ribbon breaks.

8 Claims, 7 Drawing Figures

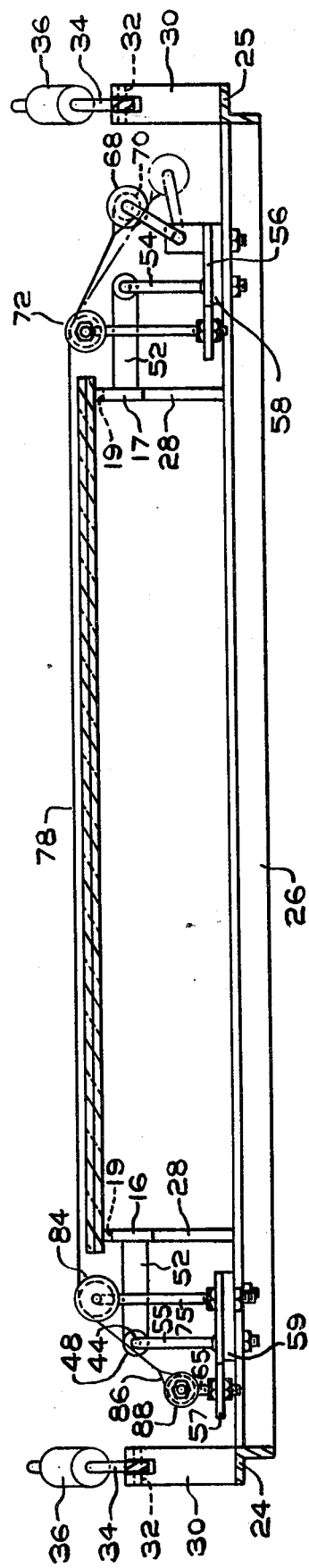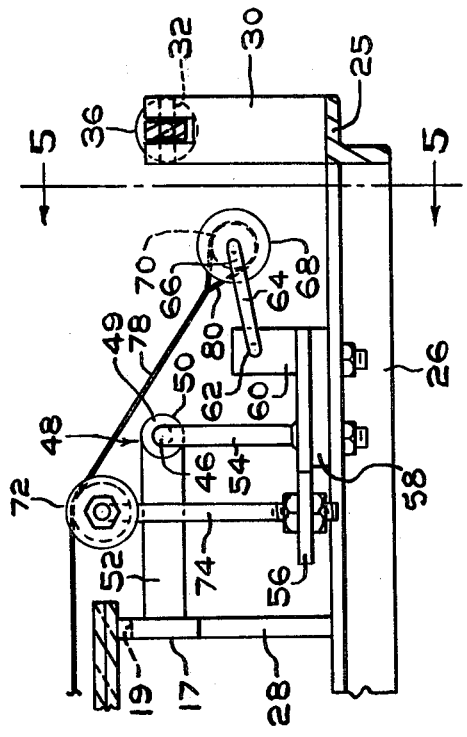

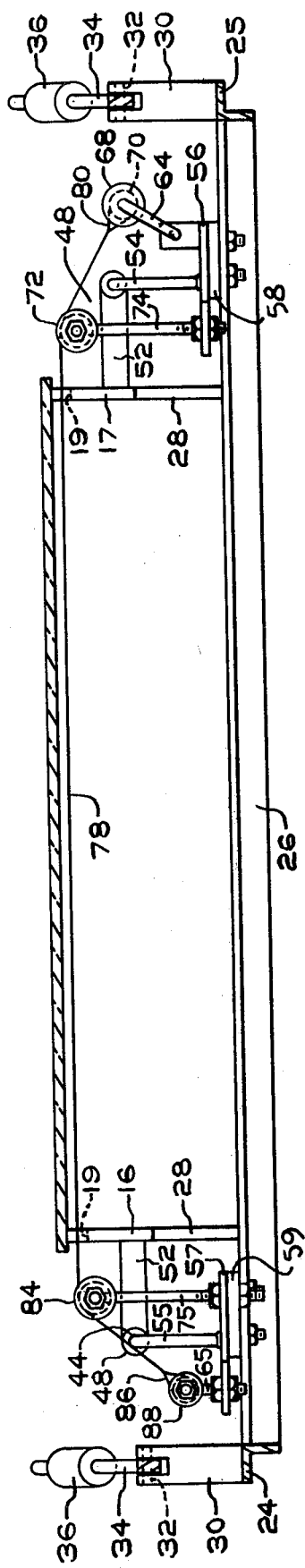

APPARATUS FOR FABRICATING SHARPLY BENT GLASS SHEETS

BACKGROUND OF THE INVENTION

Automobile stylists have been interested in shaping glass sheets to conform to the shape of the automobile in which the glass sheet is mounted. Recently, there has been interest in providing the automobile with one or more sharply bent lines or creases extending lengthwise of the automobile, such as along the hood, the roof, and/or even the rear trunk. Therefore, it has become desirable to develop method and apparatus for bending glass sheets to be used in automobile windshields, backlights, sidelights, and even roof lights and rear quarter windows to provide a sharply bent crease extending completely across the width of the bent glass sheet to provide a continuation of each line of sharp bending in the automobile body.

DESCRIPTION OF THE PRIOR ART

U.S. Pat. No. 3,795,501 to Robert A. Jansson and Thomas J. Reese; U.S. Pat. No. 3,795,570 to Robert A. Jansson and Dean L. Thomas; U.S. Pat. No. 3,847,586 to Thomas J. Reese, George R. Claassen and Melvin W. Tobin; U.S. Pat. No. 4,047,916 to Thomas J. Reese, James R. Mortimer, Melvin W. Tobin, and Stephen J. D. Jursa; and U.S. Pat. No. 4,072,493 to Vaughn R. Imler relate to methods and apparatus for bending glass sheets into curvatures including a sharp bend using one or more narrow, elongated ribbons of electroconductive material which are aligned with the line of sharp bending desired in glass sheets. The first three of these patents require a complicated loading and unloading of the glass relative to the mold because of the need to apply and remove the one or more narrow elongated ribbons of electroconductive material relative to the glass sheet in conjunction with loading or unloading the glass sheet relative to the bending mold.

U.S. Pat. No. 4,047,916 provides a relatively rapid means of applying and removing electroconductive ribbons in superposed position over glass sheets mounted on an outline bending mold of the gravity sag type for bending. However, weights which are attached to the ends of the ribbons, would fall onto the floor of a furnace should the ribbon break. In a furnace provided with electroconductive heating elements disposed both in the roof and in the floor of the furnace, the metal weights used to tension the ribbons would short-circuit some of the heating elements in the floor of the furnace and provide problems for controlling the temperature pattern throughout the furnace.

U.S. Pat. No. 4,072,493 to Imler provides means for supporting electroconductive heating ribbons below the mold in closely spaced relation to the bottom surface of the glass. However, the means to tension the ribbons in these molds extend over a large area and require a relatively wide mold support structure for the outline bending mold in order to support the ribbon tensioning apparatus. Such large ribbon-tensioning apparatus interferes with the thermal efficiency of the heating furnace. A large portion of the furnace is occupied by the ribbon tensioning elements associated with the mold. Consequently, fewer molds can be accomodated along the furnace length.

SUMMARY OF THE INVENTION

The present invention provides an improvement in outline bending molds of the gravity sag type used to shape one or more glass sheets into curvatures that includes at least one line of sharp curvature. According to the present invention, the outline bending mold comprises means stronger than the electroconductive heating ribbon connecting one or more movable electrodes to a mold support structure in such a manner that it limits the movement of the movable electrode or movable electrodes relative to the mold and maintains the electrode connected to the mold in the event the ribbon breaks. Such a construction provides an economy of space for the device that limits the movement of the movable electrode or electrodes so as to permit a maximum number of bending molds to be conveyed in side-by-side relation through the length of the bending furnace. In addition, having the additional connection of means that is stronger than the heating ribbon used to apply the localized line of intense heating in the glass sheet maintains the electrode connected to the mold in the event the ribbon breaks.

The various advantages of the present invention over the prior art will become evident in the light of a description of an illustrative preferred embodiment and various modifications thereof that follows.

BRIEF DESCRIPTION OF THE DRAWINGS

In the drawings that form part of the description of the illustrative embodiment and variations thereof of the present invention, and wherein like reference numbers refer to like structural elements.

FIG. 3 is a fragmentary cross-sectional view taken along the line 3—3 of FIG. 1, showing how the pivotable electrode is mounted on a pivot arm carried by a mold support structure and how a portion of an electroconductive ribbon is arranged relative to an insulator support when the mold is first loaded with rigid glass sheets for bending;

FIG. 4 is a fragmentary, enlarged view similar to the right hand end portion of FIG. 3, showing how the weighted, pivotable electrode pivots with its pivot rod to maintain the electroconductive heating ribbon tight when the ribbon is heated by electricity during the operation of the mold;

FIG. 5 is a fragmentary end view along the lines 5—5 of FIG. 4 showing details of the construction of the movable weighted electrode and connections thereto;

FIG. 6 is a view similar to FIG. 3 of an alternate embodiment of this invention for supporting an electroconductive ribbon below the shaping surface of an outline mold when the latter is used to shape a single sheet of glass to a sharply bent shape; and FIG. 7 is an enlarged, fragmentary view of a portion of the view of FIG. 3 or FIG. 6, showing how the present invention maintains the pivotable electrode attached to the mold should the electroconductive heating ribbon break during use.

DESCRIPTION OF ILLUSTRATIVE EMBODIMENT

Figure 1:
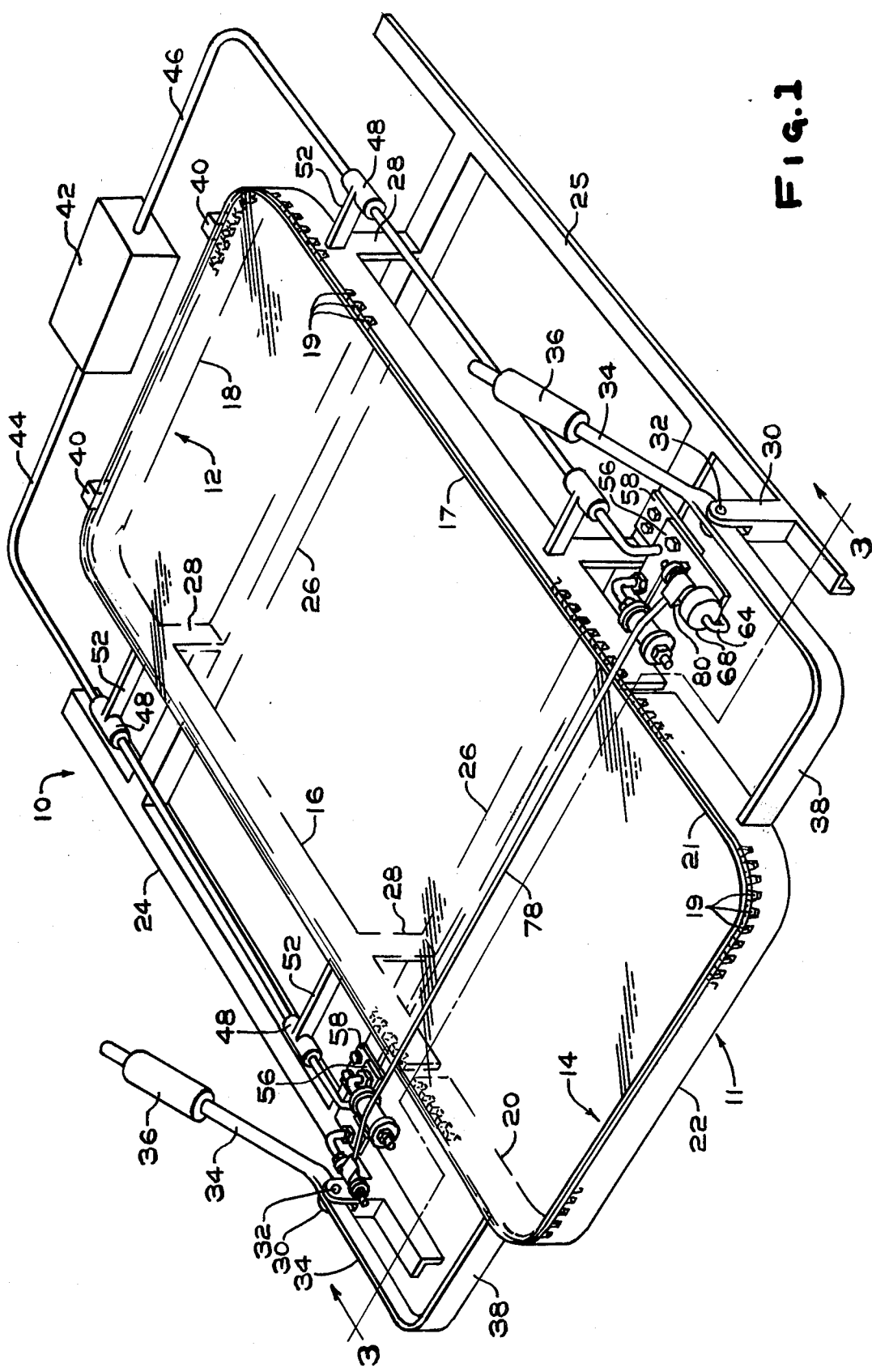
FIG. 1 is a perspective view of a mold for bending a pair of glass sheets that is provided with an electroconductive ribbon attached at one end to a pivotable electrode according to the teaching of the present invention, with the mold depicted in an open, spread position to support flat glass sheets for bending.
Figure 2:
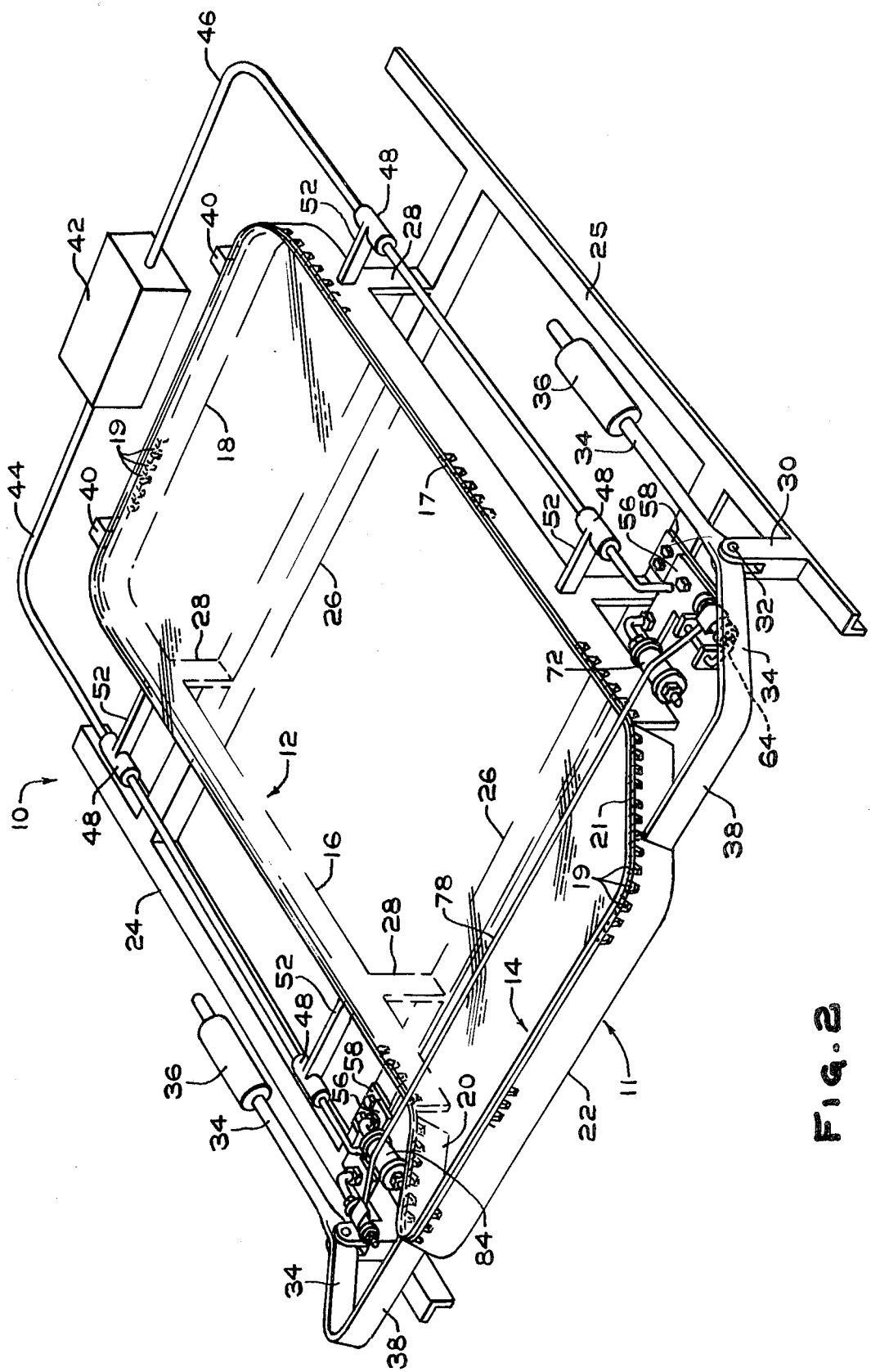
FIG. 2 is a view similar to FIG. 1, showing the mold in the closed mold position.

Apparatus modified according to the present invention comprises a mold support structure 10 that supports an outline mold 11. The latter includes a main mold section 12 and an end mold section 14. The main mold section 12 comprises a continuous metal rail having a pair of longitudinally extending side rail portions 16 and 17 interconnected at one end by a transversely extending end rail portion 18, also constructed of metal. The continuous metal rail portions are each disposed with its width dimension essentially vertical and with an upper edge surface shaped longitudinally to provide a shape that conforms in elevation and outline to the shape desired a short distance (about 5/16 inch or 8 millimeters) inside the peripheral margin of one or more glass sheets supported for bending (two glass sheets being shows in FIGS. 1 to 5 of the drawings). The upper edge surfaces of side rail portions 16 and 17 and end rail portion 18 may be provided with serrations 19 spaced along substantially the entire length thereof to reduce glass to metal mold contact during the glass sheet shaping operation.

The end mold section 14 comprises a continuous metal rail that includes a pair of relatively short, longitudinally extending, side rail portions 20 and 21 interconnected by an end rail portion 22 that extends between the outer longitudinal ends of the side rail portions 20 and 21.

The mold support structure 10 for the mold sections 12 and 14 comprises a pair of longitudinally extending angle-iron supports 24 and 24 interconnected by a plurality of angle cross-braces 26. Mold rail sections 16 and 17 are supported on the cross-braces 26 by vertically extending mold rail support uprights 28 that interconnect the bottom portions of the respective mold rail sections 16 and 17 with the upper portions of the cross-braces 26. A bearing bracket 30 extends upward from each longitudinally extending support 24 and 25 to receive a hinge 32. a weighted lever arm 34 having a weight 36 at its longitudinally inner end and an angled extension 38 connected at its longitudinally outer end to an adjacent side rail portion 20 or 21 of end mold section 14 is pivoted about the corresponding hinge 32 and is constructed and arranged to have a net closing moment of force about its corresponding hinge 32 in a manner well known in the art. The size of the net closing force is counterbalanced by a rigid glass sheet or sheets supported on the mold to maintain the mold in its open position depicted in FIG. 1, but is sufficient to rotate the end mold section 14 and a portion of heat-softened glass sheet supported thereon to the closed mold position depicted in FIG. 2.

Where the mold is used to shape one or more glass sheets about only one sharp line of bending, two or more end stops 40 are provided adjacent to but slightly longitudinally outward of end rail 18 to guide the proper alignment of one or more glass sheets mounted on the mold for bending. It is understood that if the glass is to be bent to a shape that includes a pair of sharply bent portions, the end stops are omitted and the mold is provided with a pivotable end mold section at each longitudinal extremity of the main mold section. The weight of the glass, while rigid, holds the end mold sections open and trained operators can load one or more flat glass sheets onto a sectionalized mold having end mold sections flanking the main mold section in such a manner that the longitudinal extremity portions at either longitudinal extremity of the glass sheet extend approximately equal distances beyond the corresponding outside longitudinal ends of the end mold sections without relying on guidance provided by the end stops present in molds having only one end mold section as those depicted in FIGS. 1 to 5.

The mold according to the illustrative embodiment of FIGS. 1 to 5 supports a junction box 42 having a pair of terminals (not shown) adapted for electrical connection to terminals forming part of a voltage supply circuit (not shown). A pair of lead rods 44 and 46 extend from the terminals of the junction box 42.

Lead rod 44 extends around the portion of the perimeter of the outline mold 10 that comprises a portion of each rail portion 18 and approximately the entire length of side rail portion 16 through several insulators 48. Each of the latter comprises a ceramic tube 49 (FIG. 5) surrounding a short portion of the length of lead rod 44 and a metal sleeve 50 surrounding the ceramic tube 49. A metal spacer means 52 rigidly connects the metal sleeve 50 of each insulator 48 that surrounds lead rod 44 to the outer surface of side rail portion 16. Lead rod 46 extends through similar insulators 48 supported by metal spacer means 52 in spaced relation to the outer surface of side rail portion 17 to enable lead rod 46 to extend from the junction box 42 in spaced relation to another portion of the length of end rail portion 18 and then in spaced relation to the length of end rail portion 17.

Lead rod 46 terminates in a vertical extension 54 of lead rod 46. Extension 54 is attached to a metal plate 56. An insulator plate 58 is fixed to the upper surface of one of the angle cross braces 26 and extends longitudinally of the mold therefrom in cantilever relation. The metal plate 56 is rigidly attached to the upper surface of insulator plate 58 and extends longitudinally of the mold therebeyond in cantilever relation.

Metal plate 56 supports a pair of metal bearing blocks 60, as best seen in FIG. 5. A U-shaped conducting rod 62 having a looped end portion 64 is pivotally supported by the bearing blocks 60. Conducting rod 62 has a reversely extending portion 66. A metal weight 68, having an axially extending extension 70, is rigidly mounted to the reversely extending portion 66 of conducting rod 62.

An insulator spool 72 is carried by a horizontal leg 73 of an angled spool support member 74. The latter has an externally threaded vertical leg extending through aligned apertures in metal plate 56 and insulator plate 58. Lock nuts 76 threaded on the vertical leg above metal plate 56 and below insulator plate 58 control the vertical position of insulator spool 72. Horizontal leg 73 is also externally threaded to receive lock nuts 77 on opposite sides of insulator spool 72 to control the horizontal location thereof.

A ribbon 78 extends from a relatively wide looped end 80 thereof surrounding an electrode 82, which is composed of the extension 70 and the weight 68, over the insulator spool 72, across the mold, and over another insulator spool 84 (FIG. 3) rigidly supported from angled cross-brace 26 laterally outside of side rail portion 16 to a looped end 86 of ribbon 78 surrounding a rigidly supported electrode 88. Lead rod 44 is electrically connected to the rigidly supported electrode 88 in insulated relation to metal mold 10 in a manner similar to the electrical connection from lead rod 46 to electrode 82, except for lack of a pivotable support for electrode 88. In other words, another insulator plate 59 (similar to insulator plate 58) supports another metal plate 57 (similar to metal plate 56) on the laterally outer side of side rail portion 16 atop angle cross-brace 26. However, electrode 88 is mounted on an externally threaded vertical rod 65 while the insulator spool 84 is supported by the horizontal leg of an externally threaded angled spool support member 75. The vertical positions of the electrode 88 and the spool 84 are controlled through lock nuts that engage the threads of vertical rod 65 and the threads of an externally threaded vertical leg of spool support member 75 and that bear on opposite surfaces of the other metal plate 57.

The looped end portion 64 of the conducting rod 62 serves as a short lever arm for weight 68 and extension 70 to tension the electroconductive ribbon 78 when the ribbon 78 expands thermally due to the application of voltage across the terminals of the junction box 42. The length of the end portion 64 is relatively short to limit the volume defined by the arc through which movable electrode 82 can move relative to electrode 88. However, the movable electrode 82 remains connected to the mold 12 in movable relation thereto while insulated therefrom through the connecting means defined by the conducting rod 62, the bearing blocks 60, the metal plate 56, the insulator plate 58, the corresponding angle cross-brace 26 and the support uprights 28. Thus, the connecting means occupies a relatively small space while it permits the movable electrode 82 to move in an arcuate path that corresponds to the increase in length due to thermal expansion of ribbon 78 that takes place during a glass sheet bending operation when the end portion 64 of conducting rod 62 rotates relative to the axis defined by the bearings in metal bearing blocks 60. Weight 68 and its extension 70 comprising electrode 82 pivot from the full line position to the phantom position of FIG. 3 (shown enlarged in FIG. 4) as the ribbon 78 expands. Thus, the weighted electrode 82 comprising the weight 68 and its extension 70 maintains the ribbon 78 tight during the application of electrical energy to the ribbon from the voltage difference applied through the respective terminals of the junction box 42 to electrode 82 through the lead rod 46, its vertical extension 54, the right-hand metal plate 56, the metal bearing blocks 60, the conducting rod 62, its looped end 64, and its reversely extending portion 66 and to the electrode 88 through the lead rod 44, its vertical extension 55, metal plate 57 and threaded rod 65.

Insulator spools 72 and 84 are peripherally grooved in their center portion to guide the location of the ribbon 78 as it passes thereacross. Thus, the adjusted positions of the insulator spools along the length of the lead rods 46 and 44, respectively, conrol the positioning of the ribbon 78 so that the latter faces a portion of a glass sheet or sheets to be sharply bent and does not move transversely of its length to a position facing a portion of a glass sheet other than the portion desired to be sharply bent.

In bending glass sheets in pairs, it is preferable to position the ribbon 78 in closely spaced relation overlying the upper glass sheet of the pair so that the sheets are bent sharply in unison without causing unduly large gaps between the sheets during their shaping. However, if only one sheet is to be bent, it is preferred to locate the ribbon 78 in closely spaced position below the lower surface of the single glass sheet mounted on the mold for shaping.

FIG. 6 shows a variation of the present invention from that depicted in FIGS. 1 to 5. In FIG. 6, the positions of the insulator spools 72 and 84 are adjusted to support a tightened electroconductive ribbon 78 therebetween in a position slightly below the upper edge surfaces of the side rail portions 16 and 17 in the spaces between the ends of side rail portions 16 and 17 and the adjacent corresponding ends of end rail portions 20 and 21, as described and claimed in U.S. Pat. No. 4,072,493. Loading a flat glass sheet on the mold and unloading the shaped glass sheet from the mold is facilitated by positioning the ribbon beneath and in closely spaced relation to the under surface of the glass sheet mounted on the mold.

Typical ribbons used with weighted, movable electrodes in the molds described previously are composed of a nickel-chromium alloy available commercially as "Nichrome V" from Driver Harris Company, Harrison, N.J., or "Tophet A" ribbon from Wilber B. Driver Company, Newark, N.J. Two ribbons connected in electrical parallel, each 3/16 inch (4.7 mm) wide and 8 mils (0.2 mm) thick, spaced about ⅛ inch (3.2 mm) apart and located about 1.75 inches (44.5 mm) above the glass were subjected to 72 amperes and 78 volts for 5 minutes after 4 minutes of preheat at 1050° F. (566° C.) to bend a pair of glass sheets subsequently laminated into a laminated quarter light. A single ribbon of said cross-section supported approximately 5/16 inch (7.9 mm) below the glass successfully bent other parts when subjected to 42 amperes and 17 volts for 2 minutes after 1 minute of preheat at 1210° F. (607° C.). Other ribbons used in series-connected pairs with weighted, pivotably supported electrodes were placed approximately ¼ inch (6.35 mm) below the glass sheet and subjected to 42 amperes and 48 volts for one minute after 45 seconds of preheat at 1125° F. (654° C.). The ribbon dimensions are exemplary and ribbon cross-sections are enough to resist burnout in bending operations when as much power as 35 amperes and 65 volts are applied to ribbons ⅛ inch (3.2 mm) wide and 10 mils (0.25 mm) thick and 47 amperes and 69 volts are applied to ribbons 3/16 inch (4.7 mm) wide and 8 mils (0.2 mm) thick.

In both embodiments of the present invention, should the ribbon 78 break, movable electrode 82 pivots freely to the downwardly hung position of FIG. 7. Alternatively, a stop may be provided to limit the angle of free pivoting of the electrode. In either pivoted position, the movable electrode 82 remains attached to the mold support structure 10 because the conducting rod 62 which pivotally connects the electrode 82 to the bearing blocks 60 comprises means that connects the movable electrode 82 to the mold support structure 10 that is stronger than the ribbon 78. In this manner, the weighted movable electrode 82 does not fall off the mold to the floor of a bending furnace, from which it would be difficult to retrieve the fallen electrode.

Since a metal member resting on electrical resistance heating elements on the floor of the furnace would short circuit the heating elements, it would become necessary to remove the fallen weighted electrode from the floor of the furnace as rapidly as possible. Therefore, production would have to stop until the weighted electrode is removed. According to the present invention, the movable electrode remains attached to the mold support structure even when the ribbon breaks. There is no loss of production time for using the furnace; only the loss of one bent glass article results from the ribbon break. The mold with a broken ribbon can be repaired when it moves to a position along a mold transporting conveyor at which the broken ribbon can be replaced without interrupting the flow of bending molds along the conveyor.

The embodiments described previously provide means stronger than the ribbon in the form of a rigid conducting rod to connect a movable electrode to the mold support structure to keep it connected to the mold should the ribbon break. However, the present invention also contemplates that the connecting means stronger than the ribbon can be flexible as well as rigid. For example, tether means in the form of a flexible chain or cable may attach a movable electrode to the mold support.

It is also within the purview of the present invention to provide either rigid or flexible attachment means stronger than the ribbon for each electrode for each ribbon provided on the bending mold if the dimension of the glass sheet to be bent sharply is so long that the thermal expansion of the ribbon would be so great that it would be impractical to permit one electrode to move a distance corresponding to the total thermal expansion of the ribbon. By applying connecting means between the electrodes for each ribbon and the mold support structure that permits each electrode to move relative to the mold support structure, the total electrode movement for each ribbon is divided between the electrodes. This permits the use of shorter connecting rods or tether means at each side of the mold, thereby providing economy of space for the mold.

The present invention provides the following advantages in molds for making sharply bent glass sheets. The electrode movement permits a large amount of thermal expansion of each heating ribbon. The construction permits ready replacement of a broken ribbon. The electrode remains attached to the mold in case the ribbon breaks. The device takes up a small amount of space. The ribbon is elongated by tensioning it over smoothly surfaced spools which do not cause the ribbon to become crimped. A plurality of ribbons can be used to produce one or more sharp bends and can be connected electrically either in series or parallel or in series-parallel circuits as desired. In addition, both the vertical and horizontal planes in which each ribbon is located can be adjusted readily.

The form of the invention shown and described in this specification represents a preferred illustrative embodiment and certain modifications thereof. It is understood that various changes may be made without departing from the gist of the invention as defined in the claimed subject matter that follows.

I claim:

1. Apparatus for shaping a glass sheet to a line of sharp bending comprising:
    a mold support frame;
    a gravity sag bending mold affixed to said frame having upwardly facing shaping surfaces defining the desired contour for the bent glass sheet, including two mold sections adjoining each other along the line of sharp bending, at least one mold section being mounted for pivoting motion with respect to the other mold section about an axis parallel to a line of intended sharp bending across a sheet of glass supported on said shaping surfaces;
    an elongated, flexible, electrical resistance heating element extending across the mold closely adjacent and parallel to said line of sharp bending;
    means for supplying electric current to the heating element;
    support members rigidly carried on the mold support frame on opposite sides of the bending mold retaining an intermediate portion of the heating element at a predetermined elevation; and
    gravity biased means engaging an end of the heating element for applying tension along the length of the heating element, including a canted pivot arm, to one end portion of which a weight and the heating element are affixed, and the opposite end portion of which is pivotably affixed to the mold support frame, whereby the force of gravity on the weight maintains the intermediate portion of the ribbon taut between said support members, and the pivot arm retains the weight on the mold support frame in the event of heater element breakage.

2. The apparatus of claim 1 wherein said support members are mounted so as to support the heating element at an elevation slightly above the plane of support of a glass sheet on the mold.

3. The apparatus of claim 1 wherein said support members are mounted so as to support the heating element below the plane of support of a glass sheet on the mold.

4. The apparatus of claim 2 or 1 wherein said support members include rounded upper surfaces upon which the heating element slidably rests.

5. The apparatus of claim 1 wherein said means for supplying electric current to the heating element includes a terminal rigidly carried by the mold support frame at the opposite side of the mold from said gravity biased means.

6. The apparatus of claim 5 wherein said means for supplying electric current includes conductor means in electrical communication with said pivot arm.

7. The apparatus of claim 6 wherein the heating element is provided with a loop at each end, one loop extending around said terminal and the other loop extending around a portion of the pivot arm.

8. The apparatus of claim 7 wherein said heating element is a metallic ribbon.

* * * * *